United States Patent
Kathuria

(10) Patent No.: US 11,749,105 B2
(45) Date of Patent: Sep. 5, 2023

(54) VEHICULAR COMMUNICATION SYSTEM WITH TURN SIGNAL IDENTIFICATION

(71) Applicant: Magna Electronics Inc., Auburn Hills, MI (US)

(72) Inventor: Abhijot Singh Kathuria, Auburn Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 17/449,524

(22) Filed: Sep. 30, 2021

(65) Prior Publication Data

US 2022/0108602 A1     Apr. 7, 2022

Related U.S. Application Data

(60) Provisional application No. 63/198,172, filed on Oct. 1, 2020.

(51) Int. Cl.
*G08G 1/01* (2006.01)
*H04W 4/46* (2018.01)

(52) U.S. Cl.
CPC .......... *G08G 1/0112* (2013.01); *H04W 4/46* (2018.02)

(58) Field of Classification Search
CPC ........ G08G 1/0112; G08G 1/112; H04W 4/46
USPC ....................................................... 340/902
See application file for complete search history.

(56) References Cited

U.S. PATENT DOCUMENTS

| | | |
|---|---|---|
| 5,550,677 A | 8/1996 | Schofield et al. |
| 5,555,555 A * | 9/1996 | Sato .................. G06V 10/48 |
| | | 382/104 |
| 5,583,495 A * | 12/1996 | Ben Lulu .............. B60Q 9/008 |
| | | 340/904 |
| 5,670,935 A | 9/1997 | Schofield et al. |
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,201,642 B1 | 3/2001 | Bos |
| 6,222,447 B1 | 4/2001 | Schofield et al. |
| 6,302,545 B1 | 10/2001 | Schofield et al. |
| 6,396,397 B1 | 5/2002 | Bos et al. |

(Continued)

*Primary Examiner* — Kerri L McNally
*Assistant Examiner* — Thang D Tran
(74) *Attorney, Agent, or Firm* — HONIGMAN LLP

(57) ABSTRACT

A vehicular communication system includes a wireless communication device disposed at an equipped vehicle and operable to wirelessly communicate with other vehicles near the equipped vehicle. A control includes electronic circuitry and associated software. The control, responsive to receiving an indication of an impending lane change or turn by the equipped vehicle, generates an alert and the wireless communication device communicates the alert to at least one other vehicle within a threshold distance of the equipped vehicle. The wireless communication device may receive from another vehicle remote from the equipped vehicle an alert of an impending lateral movement by the other vehicle, and may, responsive to determining that the other vehicle is within a threshold distance of the equipped vehicle, display that alert on a display device disposed within the equipped vehicle and viewable by a driver of the equipped vehicle.

20 Claims, 6 Drawing Sheets

(56) References Cited

U.S. PATENT DOCUMENTS

| | | | |
|---|---|---|---|
| 6,498,620 B2 | 12/2002 | Schofield et al. | |
| 6,523,964 B2 | 2/2003 | Schofield et al. | |
| 6,587,186 B2 | 7/2003 | Bamji et al. | |
| 6,611,202 B2 | 8/2003 | Schofield et al. | |
| 6,636,258 B2 | 10/2003 | Strumolo | |
| 6,674,895 B2 | 1/2004 | Rafii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,693,517 B2 | 2/2004 | McCarthy et al. | |
| 6,710,770 B2 | 3/2004 | Tomasi et al. | |
| 6,717,610 B1 | 4/2004 | Bos et al. | |
| 6,757,109 B2 | 6/2004 | Bos | |
| 6,798,354 B2 * | 9/2004 | Schuessler | G08G 1/162 340/995.13 |
| 6,802,617 B2 | 10/2004 | Schofield et al. | |
| 6,806,452 B2 | 10/2004 | Bos et al. | |
| 6,822,563 B2 | 11/2004 | Bos et al. | |
| 6,876,775 B2 | 4/2005 | Torunoglu | |
| 6,882,287 B2 | 4/2005 | Schofield | |
| 6,891,563 B2 | 5/2005 | Schofield et al. | |
| 6,906,793 B2 | 6/2005 | Bamji et al. | |
| 6,919,549 B2 | 7/2005 | Bamji et al. | |
| 6,946,978 B2 | 9/2005 | Schofield | |
| 7,005,974 B2 | 2/2006 | McMahon et al. | |
| 7,038,577 B2 | 5/2006 | Pawlicki et al. | |
| 7,053,357 B2 | 5/2006 | Schwarte | |
| 7,133,768 B2 * | 11/2006 | Mukaiyama | G01C 21/26 340/901 |
| 7,145,519 B2 | 12/2006 | Takahashi et al. | |
| 7,157,685 B2 | 1/2007 | Bamji et al. | |
| 7,161,616 B1 | 1/2007 | Okamoto et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,230,640 B2 | 6/2007 | Regensburger et al. | |
| 7,248,283 B2 | 7/2007 | Takagi et al. | |
| 7,283,213 B2 | 10/2007 | O'Connor et al. | |
| 7,295,229 B2 | 11/2007 | Kumata et al. | |
| 7,301,466 B2 | 11/2007 | Asai | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,580,795 B2 | 8/2009 | McCarthy et al. | |
| 7,592,928 B2 | 9/2009 | Chinomi et al. | |
| 7,720,580 B2 | 5/2010 | Higgins-Luthman | |
| 7,859,565 B2 | 12/2010 | Schofield et al. | |
| 7,881,496 B2 | 2/2011 | Camilleri et al. | |
| 3,027,029 A1 | 9/2011 | Lu et al. | |
| 8,013,780 B2 | 9/2011 | Lynam | |
| 8,694,224 B2 | 4/2014 | Chundrlik, Jr. et al. | |
| 8,818,042 B2 | 8/2014 | Schofield et al. | |
| 8,886,401 B2 | 11/2014 | Schofield et al. | |
| 8,917,169 B2 | 12/2014 | Schofield et al. | |
| 9,036,026 B2 | 5/2015 | Dellantoni et al. | |
| 9,068,390 B2 | 6/2015 | Ihlenburg et al. | |
| 9,077,098 B2 | 7/2015 | Latunski | |
| 9,077,962 B2 | 7/2015 | Shi et al. | |
| 9,090,234 B2 | 7/2015 | Johnson et al. | |
| 9,092,986 B2 | 7/2015 | Salomonsson et al. | |
| 9,126,525 B2 | 9/2015 | Lynam et al. | |
| 9,140,789 B2 | 9/2015 | Lynam | |
| 9,146,898 B2 | 9/2015 | Ihlenburg et al. | |
| 9,174,574 B2 | 11/2015 | Salomonsson | |
| 9,205,776 B2 | 12/2015 | Turk | |
| 9,233,641 B2 | 1/2016 | Sesti et al. | |
| 9,575,160 B1 | 2/2017 | Davis et al. | |
| 9,599,702 B1 | 3/2017 | Bordes et al. | |
| 9,609,289 B2 * | 3/2017 | Schofield | B60Q 1/08 |
| 9,626,869 B2 * | 4/2017 | Ariga | B60W 30/16 |
| 9,689,967 B1 | 6/2017 | Stark et al. | |
| 9,753,121 B1 | 9/2017 | Davis et al. | |
| 9,900,490 B2 | 2/2018 | Ihlenburg et al. | |
| 10,071,687 B2 | 9/2018 | Ihlenburg et al. | |
| 10,373,499 B1 * | 8/2019 | Kumar | H04W 4/38 |
| 2003/0139871 A1 * | 7/2003 | Miller | G08G 1/162 701/96 |
| 2004/0145494 A1 * | 7/2004 | Scholz | G08G 1/161 340/902 |
| 2005/0197771 A1 * | 9/2005 | Seick | G08G 1/163 701/469 |
| 2007/0109146 A1 * | 5/2007 | Tengler | G08G 1/161 340/902 |
| 2008/0077882 A1 * | 3/2008 | Kramer | G06V 20/58 715/810 |
| 2010/0245066 A1 | 9/2010 | Sarioglu et al. | |
| 2010/0289632 A1 * | 11/2010 | Seder | G06V 10/95 382/104 |
| 2012/0062743 A1 | 3/2012 | Lynam et al. | |
| 2012/0218412 A1 | 8/2012 | Dellantoni et al. | |
| 2013/0002873 A1 | 1/2013 | Hess | |
| 2013/0141578 A1 | 6/2013 | Chundrlik, Jr. et al. | |
| 2013/0215271 A1 | 8/2013 | Lu | |
| 2013/0222592 A1 | 8/2013 | Gieseke | |
| 2013/0222593 A1 | 8/2013 | Byrne et al. | |
| 2013/0242099 A1 | 9/2013 | Sauer et al. | |
| 2013/0258077 A1 | 10/2013 | Bally et al. | |
| 2013/0278769 A1 | 10/2013 | Nix et al. | |
| 2013/0298866 A1 | 11/2013 | Vogelbacher | |
| 2013/0300869 A1 | 11/2013 | Lu et al. | |
| 2013/0314503 A1 | 11/2013 | Nix et al. | |
| 2014/0005907 A1 | 1/2014 | Bajpai | |
| 2014/0025240 A1 | 1/2014 | Steigerwald et al. | |
| 2014/0028852 A1 | 1/2014 | Rathi | |
| 2014/0049646 A1 | 2/2014 | Nix | |
| 2014/0052340 A1 | 2/2014 | Bajpai | |
| 2014/0062724 A1 * | 3/2014 | Varoglu | G08G 1/163 340/902 |
| 2014/0062725 A1 * | 3/2014 | Maston | G08G 1/0133 340/905 |
| 2014/0067206 A1 | 3/2014 | Pflug | |
| 2014/0085472 A1 | 3/2014 | Lu et al. | |
| 2014/0098229 A1 | 4/2014 | Lu et al. | |
| 2014/0104426 A1 | 4/2014 | Boegel et al. | |
| 2014/0138140 A1 | 5/2014 | Sigle | |
| 2014/0139676 A1 | 5/2014 | Wierich | |
| 2014/0152825 A1 | 6/2014 | Schaffner | |
| 2014/0160276 A1 | 6/2014 | Pliefke et al. | |
| 2014/0160291 A1 | 6/2014 | Schaffner | |
| 2014/0168415 A1 | 6/2014 | Ihlenburg et al. | |
| 2014/0168437 A1 | 6/2014 | Rother et al. | |
| 2014/0211009 A1 | 7/2014 | Fursich | |
| 2014/0218529 A1 | 8/2014 | Mahmoud et al. | |
| 2014/0218535 A1 | 8/2014 | Ihlenburg et al. | |
| 2014/0226012 A1 | 8/2014 | Achenbach | |
| 2014/0232869 A1 | 8/2014 | May et al. | |
| 2014/0247352 A1 | 9/2014 | Rathi et al. | |
| 2014/0247354 A1 | 9/2014 | Knudsen | |
| 2014/0247355 A1 | 9/2014 | Ihlenburg | |
| 2014/0293042 A1 | 10/2014 | Lynam | |
| 2014/0293057 A1 | 10/2014 | Wierich | |
| 2014/0307095 A1 | 10/2014 | Wierich | |
| 2014/0309884 A1 | 10/2014 | Wolf | |
| 2014/0313339 A1 | 10/2014 | Diessner | |
| 2014/0320636 A1 | 10/2014 | Bally et al. | |
| 2014/0320658 A1 | 10/2014 | Pliefke | |
| 2014/0327772 A1 | 11/2014 | Sahba | |
| 2014/0327774 A1 | 11/2014 | Lu et al. | |
| 2014/0336876 A1 | 11/2014 | Gieseke et al. | |
| 2014/0340510 A1 | 11/2014 | Ihlenburg et al. | |
| 2014/0347486 A1 | 11/2014 | Okouneva | |
| 2014/0375476 A1 | 12/2014 | Johnson et al. | |
| 2015/0091740 A1 * | 4/2015 | Bai | B60K 35/00 340/901 |
| 2015/0124096 A1 | 5/2015 | Koravadi | |
| 2015/0158499 A1 | 6/2015 | Koravadi | |

(56) References Cited

U.S. PATENT DOCUMENTS

| | | | |
|---|---|---|---|
| 2015/0160019 A1* | 6/2015 | Biswal | G01C 21/3697 |
| | | | 701/1 |
| 2015/0251599 A1 | 9/2015 | Koravadi | |
| 2015/0254977 A1* | 9/2015 | Grabow | G08G 1/0141 |
| | | | 340/903 |
| 2015/0314783 A1* | 11/2015 | Nespolo | B60W 30/095 |
| | | | 701/301 |
| 2015/0352953 A1 | 12/2015 | Koravadi | |
| 2016/0036917 A1 | 2/2016 | Koravadi et al. | |
| 2016/0096519 A1* | 4/2016 | Gou | B60W 30/17 |
| | | | 701/41 |
| 2016/0210853 A1 | 7/2016 | Koravadi | |
| 2016/0365068 A1* | 12/2016 | Sakaguchi | B60K 35/00 |
| 2017/0036601 A1* | 2/2017 | Kimura | B60R 1/00 |
| 2017/0069205 A1* | 3/2017 | Nguyen | G08G 1/096791 |
| 2017/0116485 A1* | 4/2017 | Mullen | G08G 1/096783 |
| 2017/0174261 A1* | 6/2017 | Micks | B62D 6/00 |
| 2017/0222311 A1 | 8/2017 | Hess et al. | |
| 2017/0235135 A1* | 8/2017 | Ishiguro | G02B 27/0149 |
| | | | 345/633 |
| 2017/0254873 A1 | 9/2017 | Koravadi | |
| 2017/0276788 A1 | 9/2017 | Wodrich | |
| 2017/0313247 A1* | 11/2017 | Hsu | G08G 1/04 |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0108242 A1* | 4/2018 | Wilkinson | G08B 31/00 |
| 2018/0231635 A1 | 8/2018 | Woehlte | |
| 2018/0338241 A1* | 11/2018 | Li | H04W 4/40 |
| 2019/0019412 A1* | 1/2019 | Roca | G01S 13/931 |
| 2019/0122543 A1* | 4/2019 | Matus | G08G 1/096741 |
| 2019/0339382 A1 | 11/2019 | Hess et al. | |
| 2019/0375430 A1* | 12/2019 | Emura | B60W 50/10 |
| 2020/0031339 A1* | 1/2020 | Tanaka | B60W 30/16 |
| 2020/0209889 A1* | 7/2020 | Dev | B60R 1/00 |
| 2020/0258389 A1* | 8/2020 | Song | G08G 1/166 |
| 2020/0324790 A1* | 10/2020 | Kunz | G01C 21/3407 |
| 2020/0344602 A1* | 10/2020 | Li | H04L 67/125 |
| 2021/0020044 A1* | 1/2021 | Adkar | G07C 5/008 |
| 2021/0204306 A1* | 7/2021 | Li | H04B 7/155 |

* cited by examiner

VEHICULAR COMMUNICATION SYSTEM WITH TURN SIGNAL IDENTIFICATION

CROSS REFERENCE TO RELATED APPLICATION

The present application claims the filing benefits of U.S. provisional application Ser. No. 63/198,172, filed Oct. 1, 2020, which is hereby incorporated herein by reference in its entirety.

FIELD OF THE INVENTION

The present invention relates generally to a driving assist system for a vehicle and, more particularly, to a driving assist system that utilizes vehicle to vehicle communication.

BACKGROUND OF THE INVENTION

Communication between vehicles is known. Examples of such vehicle to vehicle or V2V communication systems are described in U.S. Pat. Nos. 6,690,268; 9,036,026 and/or 9,126,525, which are hereby incorporated herein by reference in their entireties.

SUMMARY OF THE INVENTION

Implementations herein provides a driving assistance system or communication system or vehicular communication system that includes a wireless communication device disposed at an equipped vehicle and operable to wirelessly communicate with other vehicles near the equipped vehicle. The system also includes an electronic control unit (ECU) including electronic circuitry and associated software. The electronic circuitry of the ECU includes a processor for communicating with the other vehicles via the wireless communication device. The vehicular communication system, responsive to receiving an indication of an impending lateral movement (e.g., a turn or lane change) by the equipped vehicle, communicates the indication to at least one other vehicle within a threshold distance of the equipped vehicle using the wireless communication device. The wireless communication device may receive from another vehicle remote from the equipped vehicle (e.g., a leading vehicle ahead of the equipped vehicle) an alert of an impending lateral movement by the leafing vehicle, and may, responsive to determining that the leading vehicle is within a threshold distance of the equipped vehicle, display that alert on a display device disposed within the equipped vehicle and viewable by a driver of the equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
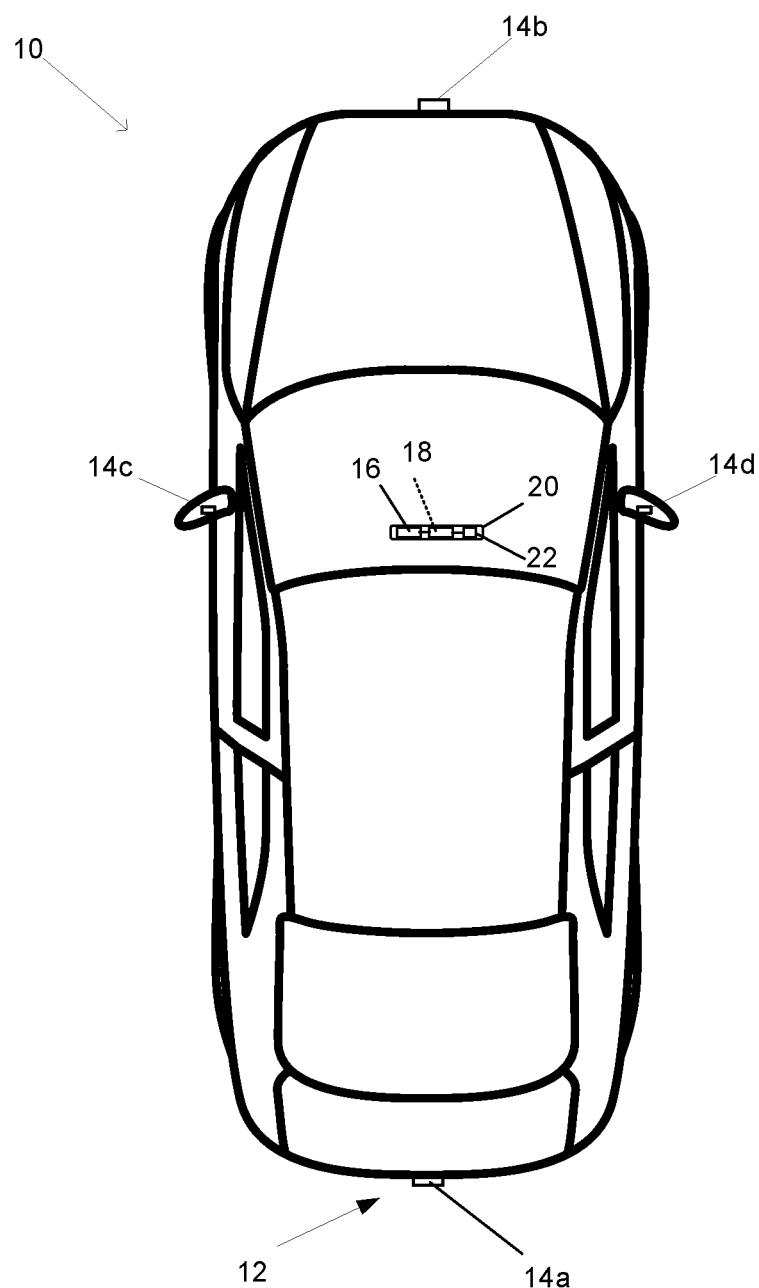
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The vehicle includes a wireless communication module 22 in communication with the ECU. The wireless communication module is configured to wirelessly communicate with nearby vehicles via, for example, infrared, BLUETOOTH, WIFI, or any other wireless technologies.

Typically, in modern vehicles, there are only two conventional ways in which vehicles and/or drivers communicate and/or interact with each other. The first is via a horn (i.e., via honking the horn to audibly communicate with other drivers) and the second is via turn signals (i.e., turn signal indicators or blinkers to visually communicate with other drivers). However, physical interaction between vehicles is often unsuccessful due to factors such as ignorance and/or inattentiveness. Due to these factors, drivers frequently forget to enable (i.e., turn "ON") their blinkers at the appropriate time to allow other drivers to be aware of an upcoming lane change or turn. Furthermore, even when drivers do enable the turn signal, often the other driver ignores or misses it due to distractions or lack of attention during those few seconds. Additionally, in some cases, drivers forget to disable their turn signals, adding more issues. These factors have resulted in many crashes and other mishaps on the road.

Implementations described herein provide a vehicular communication system that improves communications between vehicles and enables a safer mobility solution. The system may include vehicle-to-vehicle (V2V) communication technologies, and one or more of global positioning system (GPS) sensors, LIDAR sensors, and/or other lane assist features (e.g., Internet of things (IOT), infrared, BLUETOOTH, etc.). The system may operate in a manual or an automatic mode.

Figure 2:
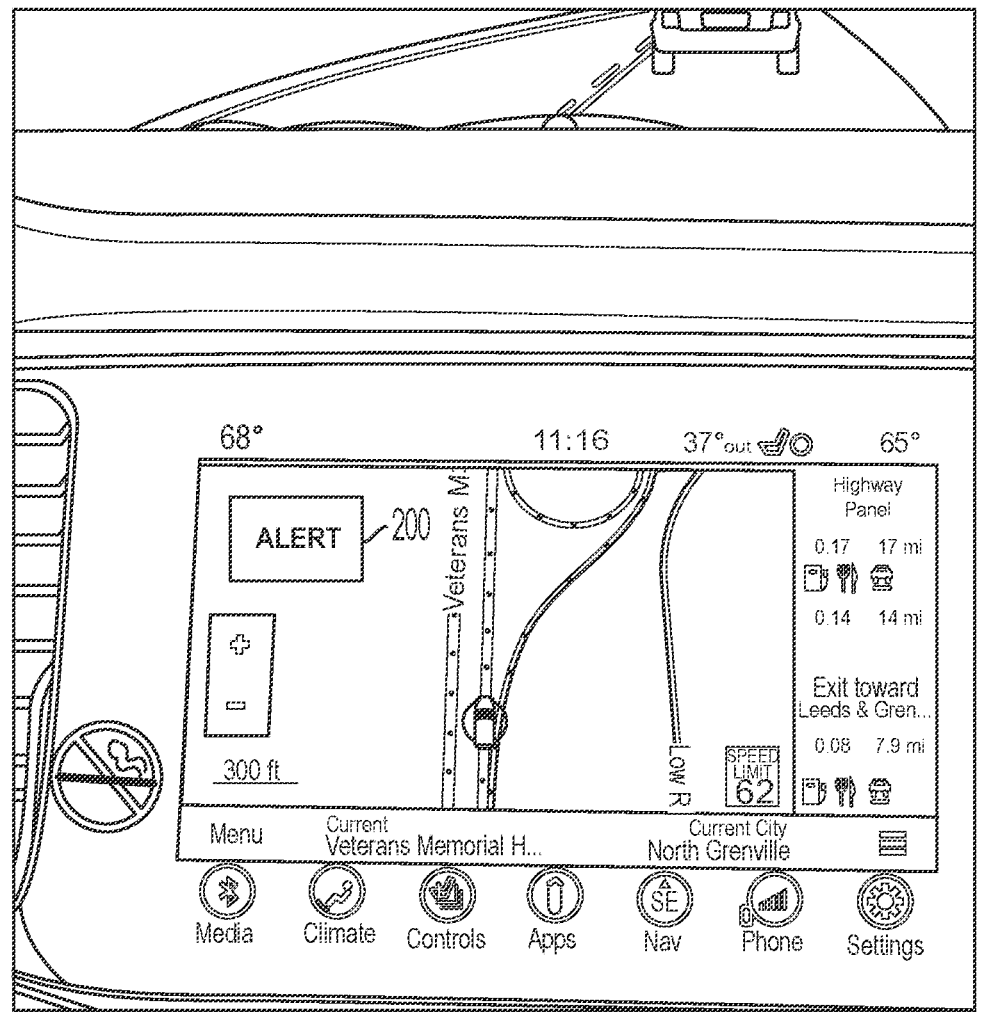
FIG. 2 is a perspective view of a central display of a vehicle displaying an alert received from another vehicle.
Figure 3:
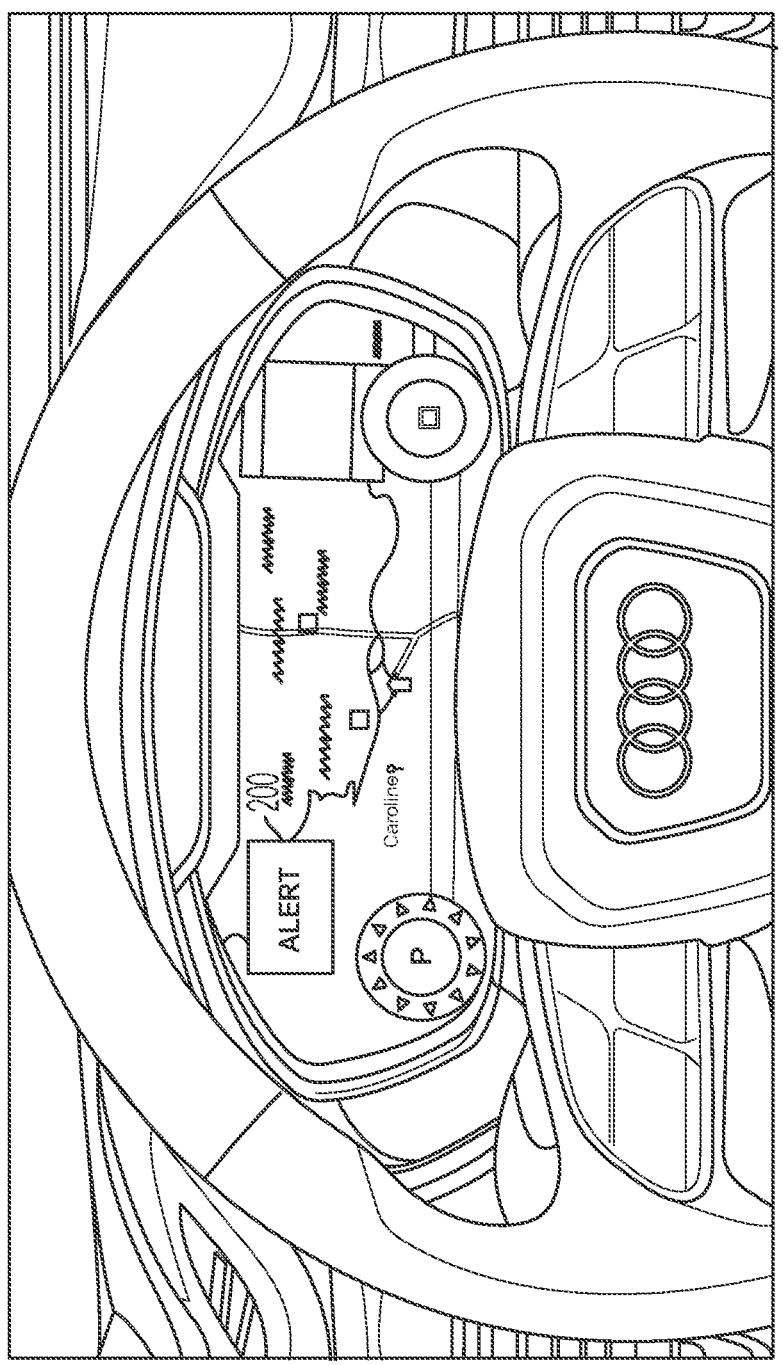
FIG. 3 is a perspective view of another display of a vehicle displaying the alert received from the other vehicle

For the manual mode, consider two vehicles (a leading vehicle and a trailing vehicle) travelling along a straight multi-lane road. When the leading vehicle desires to change lanes (or make any other lateral movement), the driver manually engages the leading vehicle's turn signal to indicate that the vehicle will shortly move left or right to change lanes. However, if the trailing driver fails to see the turn signal, an accident may occur. To avoid this, the vehicular communication system of the leading vehicle, when the driver manually engages the turn signal, immediately wirelessly (e.g., via 10T, infrared, BLUETOOTH, WIFI, etc.) connects to a communication system of the trailing vehicle and wirelessly transmits a notification alert to the trailing vehicle. The notification alert may be displayed visually on a display screen within the trailing vehicle (e.g., a multimedia screen, a speedometer screen, etc.) such as alert 200 on the screens shown in FIG. 2 and FIG. 3 and/or the alert may be provided as an audible alert (e.g., played via speakers disposed in the vehicle) and/or as a haptic alert (e.g., via vibrations in the steering wheel or seat).

The vehicle that engages the turn signal (i.e., the transmitting vehicle) may connect and wirelessly send an alert to any number of nearby vehicles (i.e., the receiving vehicles). For example, the transmitting vehicle may send the alert to every vehicle within so many feet of the transmitting vehicle. The threshold distance may differ based on the receiving vehicle's position relative to the transmitting vehicle. For example, the threshold distance may be less for vehicles in front of the transmitting vehicle than vehicles behind the transmitting vehicle. The threshold distance may vary based on speeds of the transmitting vehicle and/or the receiving vehicle(s). For example, the threshold distance may be greater when the vehicles are travelling at a greater speed. The threshold may also be based on a period of time instead of distance (e.g., vehicles within 2 seconds travelling time at the current speed of the transmitting vehicle). The distance may vary based on other factors as well (e.g., weather, time of day (day, night, etc.), and traffic conditions (light, heavy, etc.). The system may communicate with each other vehicle within range of the system, and then determine a distance between the vehicles, and the communications system of each other vehicle may determine whether to display an alert to the driver of the other vehicles based on the threshold distances, speeds, etc. between the vehicles. The system may establish communications with one or more nearby vehicles prior to the user engaging the turn signal so that an alert may be immediately transmitted via the already established communication channel. The system may determine the distance between vehicles using any number of methods such as via one or more sensors (i.e., cameras, radar, lidar, ultrasonic, etc.), GPS signals, or via timing communications between vehicle.

The alert communicated to the receiving vehicles may include both a direction the transmitting vehicle is turning or maneuvering and additional information to help identify the transmitting vehicle. For example, the alert may indicate a direction toward the transmitting vehicle relative to the receiving vehicle. For example, the alert may indicate that a vehicle in front is changing lanes to the left. The alert may also indicate a color, make, or model of the transmitting vehicle. A position of the alert on a display may indicate a direction of the transmitting vehicle. For example, the alert may be positioned around a graphical representation of the receiving vehicle, and the position of the alert may indicate a direction of the transmitting vehicle relative to the receiving vehicle. The vehicle receiving the alert may capture an image of the vehicle (e.g., with a forward viewing camera) that is preparing to change lanes or make another maneuver (i.e., the vehicle that transmitted the alert) and may display the image of the vehicle in a display. The image may include a bounding box or other graphic identifying the vehicle that sent the alert.

Figure 4:
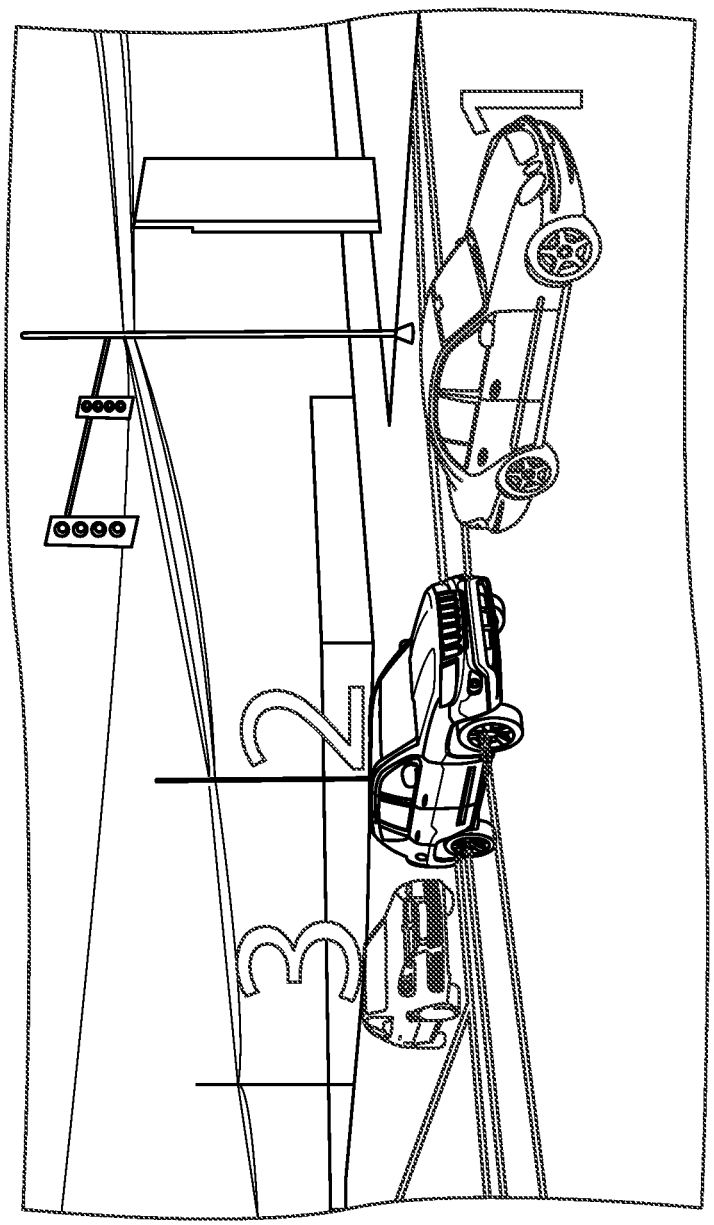
FIG. 4 is a perspective view of a driving situation where one vehicle notifies other vehicles of an intent to turn.
Figure 5:
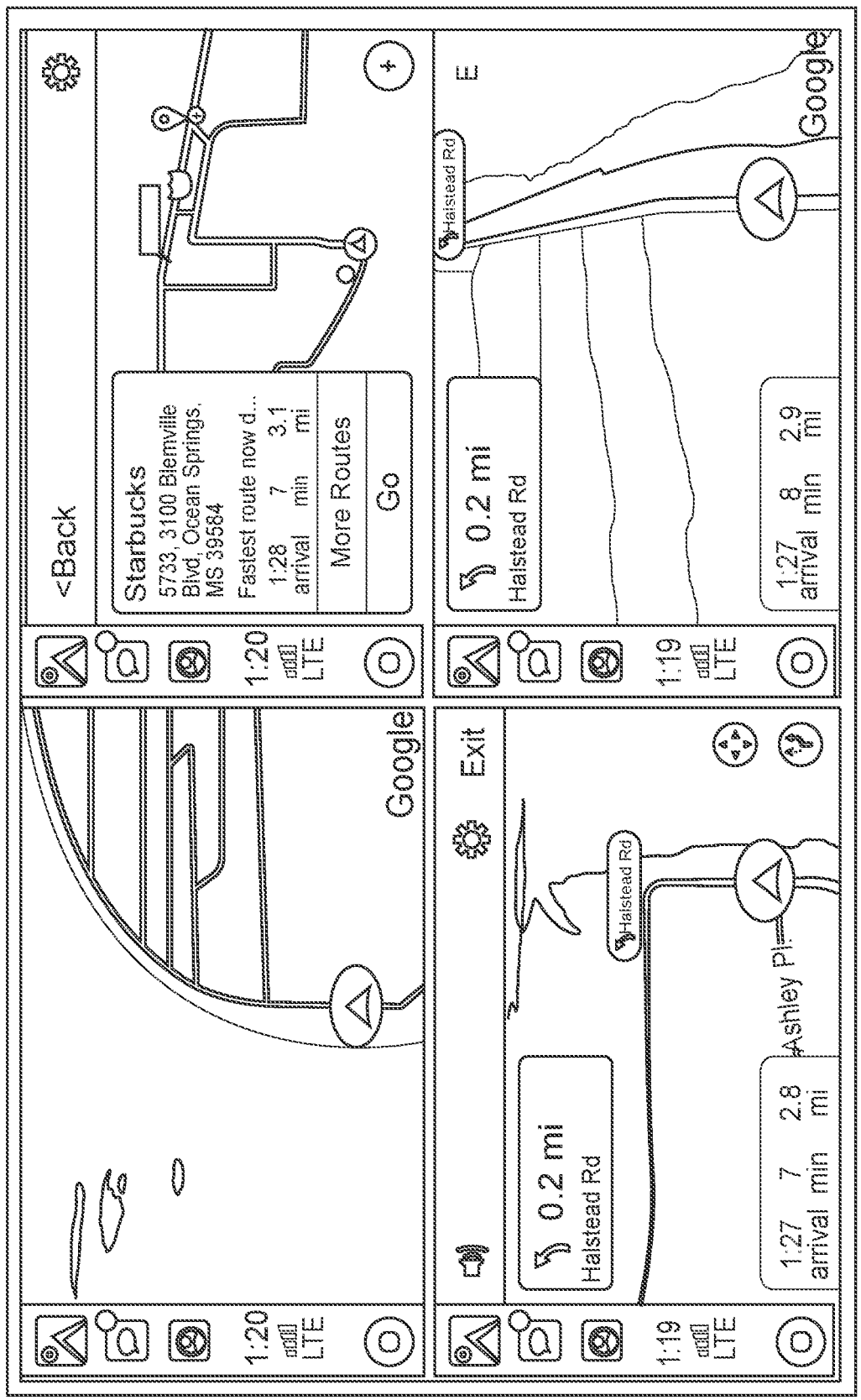
FIG. 5 is a schematic views of a navigation route of a navigation system.

Referring now to FIG. 4, in another example, when the second vehicle (i.e., "vehicle 2") manually engages its turn signal, both the first vehicle (i.e., "vehicle 1") and the third vehicle (i.e., "vehicle 3") may simultaneously receive a notification of the second vehicle's intent to turn. In other examples, only vehicle 3 receives the alert, as vehicle 1 filters the alert based on its location relative to the transmitting vehicle (i.e., because vehicle 1 is in front of vehicle 2). The alert may indicate the direction that the second vehicle has engaged their turn signal (i.e., left or right). This notification may alert the otherwise distracted or inattentive drivers of the other vehicles of the turn by the second vehicle and mitigate any turn signal failures (e.g., a malfunctioning light) of the second vehicle. The system may measure the distance between the equipped or transmitting vehicle and other surrounding vehicles using, for example, a LIDAR sensor. However, other sensors may also be used, such as ultrasonic sensors, cameras, and radar. The equipped or transmitting vehicle may determine which vehicles to notify based on results of the distance measuring sensor.

For the automatic mode of the system, consider a vehicle travelling from a starting location (e.g., Detroit) to a destination location (e.g., Chicago) and the driver uses a common navigation system based on GPS sensors to assist in navigating the vehicle from the starting location to the destination location. In this scenario, the vehicular communication system may anticipate upcoming turns and lane changes based on the navigation system (and information pertaining to traffic traveling along the road with the equipped vehicle, such as may be obtained via communications from other vehicles and/or infrastructure, or via sensors on the equipped vehicle) and automatically enable turn signals of the vehicle (in the appropriate direction based on the route) and automatically generate the alerts as described above to nearby vehicles. The system may subsequently disable the turn signal after the turn/lane change has been performed (either manually by the driver or via an autonomous or semi-autonomous driving system). When the driver deviates from directions provided or reported by the navigation system, the communication system may terminate or suspend or revert to the manual mode until the driver again re-enabled the system and/or until the driver again follows the provided navigation route or another navigation route.

Figure 6:
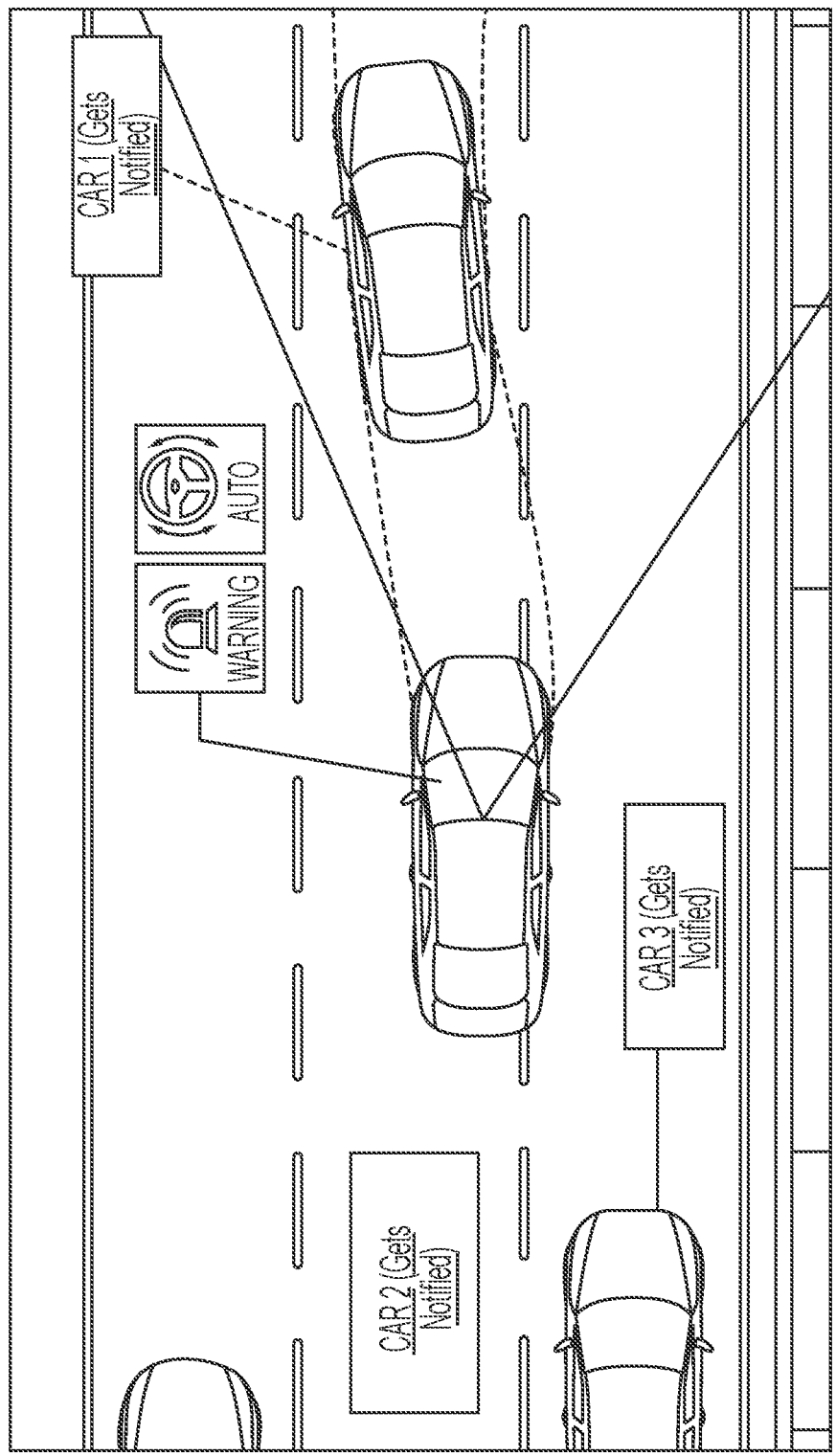
FIG. 6 is a plan view of a vehicle with a lane assist system performing a lane change.

Referring now to FIG. 6, when a vehicle with a lane assist feature is travelling along a road (e.g., an expressway), the driver may attempt a lane change or turn without enabling or engaging the turn signals of the vehicle. In this case, the lane assist feature will detect the lane change (e.g., based on movement of the vehicle within image data captured by a forward viewing camera). In addition to taking other conventional actions (e.g., warning the driver), the lane assist feature may transmit the lane change to the vehicular communication system which may in turn transmit the corresponding alerts to nearby vehicles. In this way, the vehicular communication system may warn nearby drivers even when the driver does not manually engage the turn signal nor does a navigation system provide an anticipated route. Optionally, the system may automatically engage the turn signal when the system detects that the vehicle is leaving the current lane.

Thus, the vehicular communication system determines when the vehicle is about to perform a lane change or turn (e.g., via the driver manually engaging the turn signal, via a navigation system, or via a lane assist feature) and transmits a notification to nearby vehicles warning of the impending lane change/turn. The vehicular communication system may, in some cases, automatically engage/disengage the vehicle's turn signals. The system may work in conjunction with V2V communication technologies, LIDAR sensors (or other distance measuring sensors), and/or GPS sensors. The system may also include a turn signal position sensor to determine manual engagement of the turn signal. Optionally, the system receives input from a lane keep assist or other semi-autonomous or driver assistance system.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar or lidar sensors or the like, to detect presence of and/or range to other vehicles and objects at the intersection. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system communicates with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular communication system, the vehicular communication system comprising: a wireless communication device disposed at a vehicle equipped with the vehicular communication system, wherein the wireless communication device is operable to wirelessly communicate with other vehicles within a communication range of the equipped vehicle; an electronic control unit (ECU) comprising electronic circuitry and associated software; wherein the vehicular communication system, responsive to the wireless communication device receiving, from another vehicle remote from the equipped vehicle, an alert of an impending lateral movement by the other vehicle, determines whether the other vehicle is within a threshold distance of the equipped vehicle; and wherein the vehicular communication system, responsive to determining that the other vehicle is within the threshold distance of the equipped vehicle, displays the alert on a display device disposed within the equipped vehicle and viewable by a driver of the equipped vehicle; and wherein the vehicular communication system, responsive to determining that the other vehicle is not within the threshold distance of the equipped vehicle, filters the alert from being displayed to the driver of the equipped vehicle.

2. The vehicular communication system of claim 1, wherein the threshold distance is based on a direction of the other vehicle relative to the equipped vehicle.

3. The vehicular communication system of claim 1, wherein the alert comprises a direction of the equipped vehicle relative to the other vehicle.

4. The vehicular communication system of claim 1, wherein the alert comprises an identity of the other vehicle, and wherein the displayed alert includes identification of the other vehicle to the driver of the equipped vehicle.

5. The vehicular communication system of claim 1, wherein the vehicular communication system determines a distance to the other vehicle using a LIDAR sensor.

6. The vehicular communication system of claim 1, wherein the equipped vehicle comprises a leading vehicle, and wherein the other vehicle is a trailing vehicle.

7. A vehicular communication system, the vehicular communication system comprising: a first wireless communication device disposed at a first vehicle, wherein the first wireless communication device is operable to wirelessly communicate with other vehicles within a communication range of the first vehicle; a second wireless communication device disposed at a second vehicle, wherein the second wireless communication device is operable to wirelessly communicate with other vehicles within a communication range of the second vehicle; a first electronic control unit (ECU) disposed at the first vehicle and comprising electronic circuitry and associated software; a second ECU disposed at the second vehicle and comprising electronic circuitry and associated software; wherein the first wireless communication device, responsive to the first ECU receiving an indication of impending lateral movement by the first vehicle, wirelessly communicates an alert; and wherein, responsive to the second wireless communication device receiving the alert, and responsive to the second wireless communication device determining that the first vehicle is not within a threshold distance of the second vehicle, blocks filters the alert from being displayed at a display device disposed within the second vehicle and viewable by a driver of the second vehicle.

8. The vehicular communication system of claim 7, wherein the threshold distance is dependent upon at least one selected from the group consisting of (i) a current speed of the first vehicle, (ii) a current speed of the second vehicle, (iii) a weather condition at the first and second vehicles, (iv) a current time, and (v) a current density of traffic at the first and second vehicles.

9. The vehicular communication system of claim 7, wherein the first ECU receives the indication of the impending lateral movement or turn from a turn signal indicator of the first vehicle when the turn signal indicator is actuated by a driver of the first vehicle.

10. The vehicular communication system of claim 7, wherein the alert that is wirelessly communicated by the first wireless communication device includes an identity of the first vehicle.

11. The vehicular communication system of claim 7, wherein the second vehicle determines the threshold distance responsive to sensor data, and wherein the sensor data comprises at least one selected from the group consisting of (i) image data captured by a camera of the first vehicle or the second vehicle, (ii) radar data captured by a radar sensor of the first vehicle or the second vehicle, and (iii) GPS data.

12. The vehicular communication system of claim 7, wherein the first wireless communication device communicates the alert to a plurality of vehicles determined to be within the threshold distance of the first vehicle.

13. The vehicular communication system of claim 7, wherein the first vehicle comprises a trailing vehicle, and wherein the first wireless communication device communicates the alert to the second vehicle determined to be within the threshold distance of the first vehicle and forward of the first vehicle.

14. The vehicular communication system of claim 13, wherein the second vehicle comprises a leading vehicle.

15. The vehicular communication system of claim 7, wherein the first ECU receives the indication of the impending lateral movement or turn from a navigation system of the first vehicle based on a current route the navigation system is navigating.

16. The vehicular communication system of claim 7, wherein the first ECU receives the indication of the impending lateral movement or turn from a lane assist system of the first vehicle, wherein the lane assist system detects when the first vehicle begins to move laterally relative to a traffic lane the first vehicle is travelling along.

17. The vehicular communication system of claim 7, wherein the communicated alert comprises a direction of the first vehicle relative to the second vehicle.

18. The vehicular communication system of claim 7, wherein the first ECU, responsive to receiving the indication of the impending lateral movement or turn by the first vehicle, enables a turn signal of the first vehicle.

19. The vehicular communication system of claim 7, wherein the first ECU, after the first vehicle has performed the lateral movement or turn, disables the turn signal.

20. The vehicular communication system of claim 7, wherein the second ECU determines a distance to the first vehicle using a LIDAR sensor.

* * * * *

UNITED STATES PATENT AND TRADEMARK OFFICE
CERTIFICATE OF CORRECTION

PATENT NO. : 11,749,105 B2
APPLICATION NO. : 17/449524
DATED : September 5, 2023
INVENTOR(S) : Abhijot Singh Kathuria Page 1 of 1

It is certified that error appears in the above-identified patent and that said Letters Patent is hereby corrected as shown below:

In the Claims

<u>Column 7</u>
Lines 55-56, Claim 7, "vehicle, blocks filters" should be --vehicle, filters--

Signed and Sealed this
Third Day of October, 2023

Katherine Kelly Vidal
*Director of the United States Patent and Trademark Office*